(12) United States Patent
Nakamura

(10) Patent No.: US 8,381,983 B2
(45) Date of Patent: Feb. 26, 2013

(54) APPARATUS AND METHOD FOR READING BARCODE

(75) Inventor: Hiroshi Nakamura, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/223,506

(22) Filed: Sep. 1, 2011

(65) Prior Publication Data

US 2012/0055991 A1 Mar. 8, 2012

(30) Foreign Application Priority Data

Sep. 3, 2010 (JP) ................................. 2010-198208

(51) Int. Cl.
*G06K 9/32* (2006.01)
*G06K 7/10* (2006.01)
(52) U.S. Cl. .......... 235/462.08; 235/462.12; 235/462.41
(58) Field of Classification Search ............. 235/462.08, 235/462.12, 462.41
See application file for complete search history.

(56) References Cited

U.S. PATENT DOCUMENTS

| 7,422,153 B2* | 9/2008 | Cai .......................... 235/462.01 |
| 8,172,145 B2* | 5/2012 | Rudeen .................... 235/462.08 |
| 2006/0060654 A1* | 3/2006 | Hosoi et al. ............. 235/462.12 |
| 2010/0096462 A1* | 4/2010 | Brock ...................... 235/462.41 |

FOREIGN PATENT DOCUMENTS

| JP | 09-237312 | 9/1997 |
| JP | 2001-043300 | 2/2001 |

* cited by examiner

*Primary Examiner* — Daniel Hess
(74) *Attorney, Agent, or Firm* — Frommer Lawrence & Haug LLP (57) ABSTRACT

Reliability of a decoded result on a barcode is improved without increasing a processing load and a processing time. While a medium transfer mechanism transfers a recording medium, an image capture section captures an image of a surface of the recording medium, and the image data captured is saved in an image memory. Next, a scanning line setup section sets a plurality of scanning lines for image data of a barcode, and meanwhile a decoding section decodes the barcode by making use of image data corresponding to the scanning lines. Subsequently, a judgment section calculates reading reliability according to the image data corresponding to the scanning lines, and makes a judgment on a scanning line having a highest reliability among the reading reliability values. Then, a decoded result for the scanning line corresponding to the judgment result is defined as decoded information for the barcode.

6 Claims, 5 Drawing Sheets

APPARATUS AND METHOD FOR READING BARCODE

The present application claims priority from Japanese Patent Application Nos. JP 2010-198208 filed on Sep. 3, 2010, the disclosure of which is incorporated herein by reference in its entirety.

FIELD OF THE INVENTION

The present invention relates to an apparatus and a method for reading a barcode, which optically read and decode a barcode.

DESCRIPTION OF RELATED ART

In general, a one-dimensional barcode includes a plurality of bars and a plurality of spaces (in other words, black bars and white bars) that are placed alternately as elements. Then, character information including a numeric character, an alphabetical character, a symbol, and the like can be expressed with information in a width direction of each bar and each space (for example, width dimensions and arrangement of the bars and spaces). In the meantime, reading a barcode with a barcode reading apparatus makes it possible to enter required information easily into a terminal device of a point-of-sale (POS) system and the like.

For example, in the field of commodity management and logistics control, identification information of each commodity is bar-coded and attached to the commodity or its package. Then, the barcode is optically read by using an optical reading apparatus, such as a laser scanner, a CCD (Charge Coupled Device) sensor, a CMOS (Complementary Metal Oxide Semiconductor) sensor, and so forth; and then furthermore it is decoded for automatic recognition of the identification information.

In recent years, for example, sometimes a barcode is used as a means for recording personal data into a card. In such a case, sometimes both character information, etc. and a barcode are attached onto one side of a card. Then, there also exists some type of optical reading apparatus in which an entire part of a card is scanned and the data scanned is converted into image data, and subsequently an area including a barcode is recognized in the image data.

Since the barcode is optically read out, contamination and indefinite printing on a data indication surface may lead to a reading error. Then, as a technique for reducing the chance of such a reading error, for example, known are those described in Japanese Unexamined Patent Application Publication No. H09-237312 ("JP H09-237312") and Japanese Unexamined Patent Application Publication No. 2001-43300 ("JP 2001-43300") mentioned below.

JP H09-237312 discloses a technique in which a plurality of scanning lines are set on a barcode in order to repeat reading operation while changing a scanning line with another one at a time, until it is judged in a true/false judgment that the reading operation has been done truly; and furthermore if it is judged that every reading operation with respect to all the scanning lines has been false, a character recognition section recognizes a character printed under the barcode (For example, refer to paragraphs [0033] to [0037] of JP H09-237312).

JP 2001-43300 discloses a technique in which a plurality of scanning lines are set on a barcode, and each scanning line is divided into a plurality of sections; and sections recognized to be true in a true/false judgment are combined so as to obtain a scanning line that is free from any influence of contamination, indefinite printing, and so on (For example, refer to a paragraph [0016] of JP 2001-43300).

As described in JP H09-237312 and JP 2001-43300 mentioned above, the true/false judgment in a barcode reading operation is carried out according to whether width dimensions and arrangement of each bar and each space meet a barcode standard (Refer to a paragraph [0022] of JP H09-237312 and a paragraph [0014] of JP 2001-43300). However, even if it is judged through such a judgment method that a result of a character reading operation is true, there still exists a chance that a reading error has happened in fact. A reliability of a result of the true/false judgment becomes low, for example, when a data indication surface for a barcode includes contamination, indefinite printing, etc., on it. Then, the lower the reliability of the true/false judgment is, the lower the reliability of the result of the character reading operation becomes. Therefore, the techniques of JP H09-237312 and JP 2001-43300 are disadvantageous in that it is difficult to obtain sufficient reliability of a decoded result on a barcode.

Furthermore, in the case of the technique of JP H09-237312, if any correct reading result is not obtained, a character printed under a barcode is recognized. However, character recognition is accompanied in general by a greater processing load than a barcode decoding operation is. Therefore, the technique of JP H09-237312 has a downside owing to a long processing time and a necessity of a high-performance processor, etc., which leads to a high cost of an apparatus adopting the technique.

Moreover, in the case of the technique of JP 2001-43300 as well, required is a process for combining sections that have been judged to be true in the true/false judgment, so that unfortunately a processing load increases to cause a long processing time and an objective apparatus becomes expensive.

SUMMARY OF THE INVENTION

It is an object of the present invention to provide an apparatus and a method for reading a barcode that can improve reliability of a decoded result on a barcode without increasing a processing load and a processing time.

A barcode reading apparatus according to one embodiment includes: a reading section for creating data of a barcode by optically reading a surface of a medium; an image memory for saving the data; a scanning line setup section for setting a plurality of scanning lines for the data saved in the image memory; a decoding section for decoding the barcode with respect to a part of the data corresponding to each of the scanning lines; and a judgment section for a calculation of reading reliability that represents a degree of proof against decoding error occurrence in decoding the barcode, by using the data corresponding to the scanning lines, for selecting a scanning line having a best reliability by making use of the reading reliability.

In a modification of the above described embodiment, the judgment section includes: a reading reliability calculation section for calculating the reading reliability of each of the plurality of scanning lines set by the scanning line setup section; a reading reliability judgment section for making a judgment on a best reliability value among the reading reliability values that the reading reliability calculation section calculates; and a scanning line selecting section for making a selection of a scanning line corresponding to the best reading reliability.

In another modification of the above described embodiment, the reading reliability calculation section includes: a marginal difference calculation section for calculating a marginal difference that represents a degree of proof against reading error occurrence with respect to each element datum calculated according to element width values of the barcode, for each of the plurality of scanning lines; and a reading reliability determination section for determination of the reading reliability of each of the scanning lines by selecting a smallest one among the marginal difference values corresponding to the scanning line.

In yet another modification of the above described embodiment, the decoding section includes: a means for extracting at least one character from the data corresponding to each of the scanning lines; a means for calculating each measurement value "e(i)" for a element datum of the one character for each of the scanning lines, and calculating a total length measurement value "S" of the one character; a means for calculating a ratio "m/S" between the number of unit modules "m" for the total length of the extracted one character and the total length measurement value "S", for each of the scanning lines; a means for calculating "t(i)=e(i)×m/S" and rounding off the "t(i)" to unit so as to calculate a normalized value "E(i)" of each element datum; and a means for executing a character decoding operation according to the normalized value "E(i)" of the element data; and furthermore, the marginal difference calculation section includes: a means for calculating a marginal difference for the "t(i)" with, either an absolute value of a difference between the "t(i)" and a lower limit value, or an absolute value of a difference between the "t(i)" and a higher limit value, whichever is smaller, while the lower and higher limit values for the "t(i)" that enables obtaining the normalized value "E(i)" for the element datum are "E(i)−0.5" and "E(i)+0.5", respectively.

In yet another modification of the above described embodiment, the element datum is an "edge-to-corresponding-edge distance" in the barcode.

A barcode reading method according to another embodiment includes: a first step of creating data of a barcode composed of a plurality of elements having a bar and a space by optically reading a surface of a medium; a second step of saving the data into an image memory; a third step of setting a plurality of scanning lines for the data saved in the image memory; a fourth step of decoding the barcode with respect to a part of the data corresponding to each of the scanning lines; and a fifth step of calculating reading reliability that represents a degree of proof against decoding error occurrence in decoding the barcode, by using the data corresponding to the scanning lines, for selecting a scanning line having a best reliability by making use of the reading reliability.

In a modification of the above described embodiment, the fifth step includes: a reading reliability calculation step for calculating the reading reliability of each of the plurality of scanning lines set in the third step; a reading reliability judgment step for making a judgment on a best reliability value among the reading reliability values calculated in the reading reliability calculation step; and a scanning line selecting step for making a selection of a scanning line corresponding to the best reading reliability.

In another modification of the above described embodiment, the reading reliability calculation step includes: a marginal difference calculation step for calculating a marginal difference that represents a degree of proof against reading error occurrence with respect to each element datum calculated according to element width values of the barcode, for each of the plurality of scanning lines; and a reading reliability determination step for determining the reading reliability of each of the scanning lines by selecting a smallest one among the marginal difference values corresponding to the scanning line.

In yet another modification of the above described embodiment, the fourth step includes: a step of extracting at least one character from the data corresponding to each of the scanning lines; a step of calculating each measurement value "e(i)" for a element datum of the one character for each of the scanning lines, and calculating a total length measurement value "S" of the one character; a step of calculating a ratio "m/S" between the number of unit modules "m" for the total length of the extracted one character and the total length measurement value "S", for each of the scanning lines; a step of calculating "t(i)=e(i)×m/S" and rounding off the "t(i)" to unit so as to calculate a normalized value "E(i)" of each element datum; and a step of executing a character decoding operation according to the normalized value "E(i)" of the element data; and furthermore, the marginal difference calculation step calculates; a marginal difference for the "t(i)" with, either an absolute value of a difference between the "t(i)" and a lower limit value, or an absolute value of a difference between the "t(i)" and a higher limit value, whichever is smaller, while the lower and higher limit values for the "t(i)" that enables obtaining the normalized value "E(i)" for the element datum are "E(i)−0.5" and "E(i)+0.5", respectively.

In yet another modification of the above described embodiment, the element datum is an "edge-to-corresponding-edge distance" in the barcode.

It is of course understood that any of the above embodiments and modifications thereof may be combined together According to the present invention, reliability of a decoded result on a barcode can be improved without increasing a processing load and a processing time.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

An embodiment according to the present invention is described below with reference to the accompanying drawings.

Figure 1:
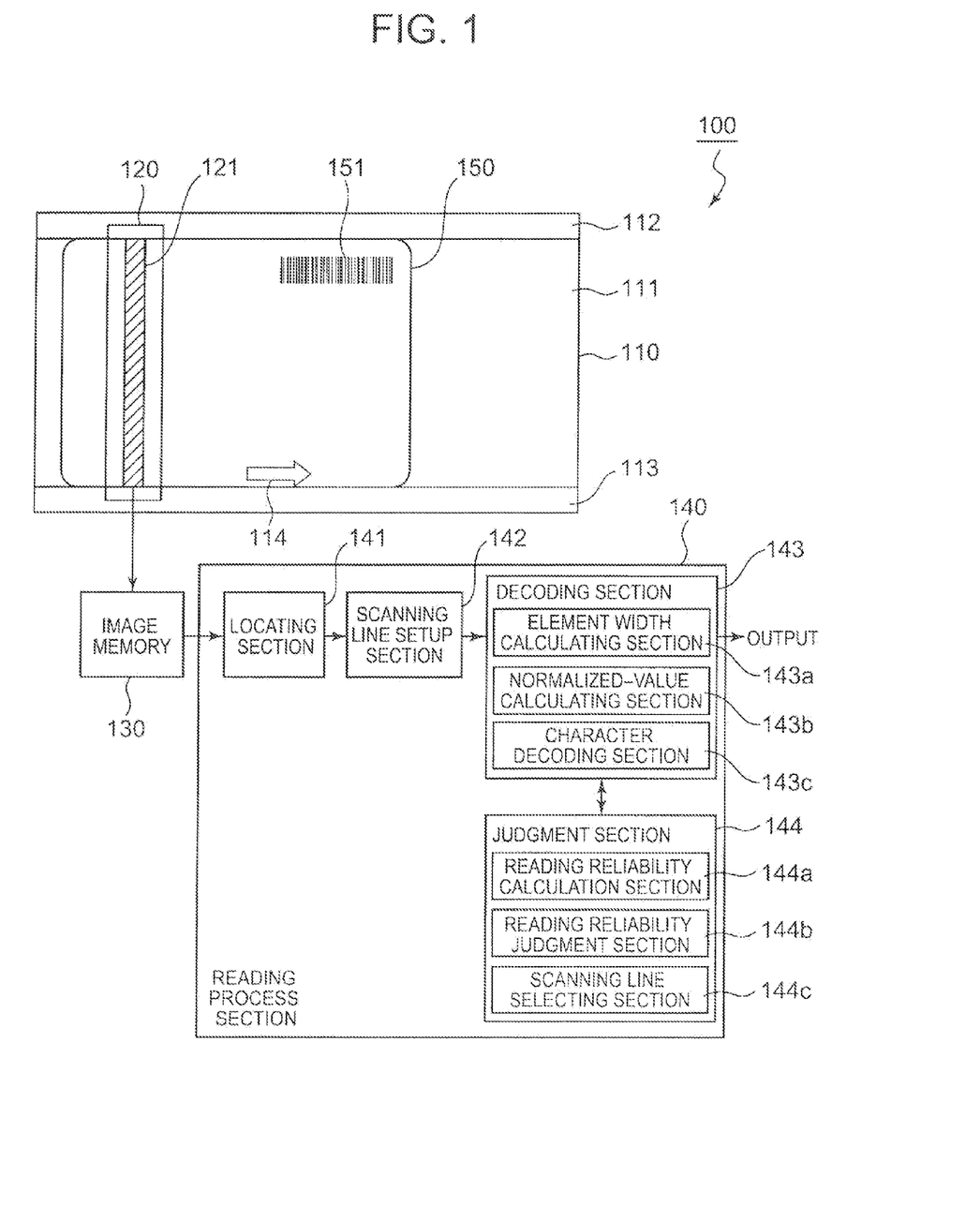
FIG. 1 is a conceptual diagram showing a structure of a barcode reading apparatus according to an embodiment.
Figure 2:
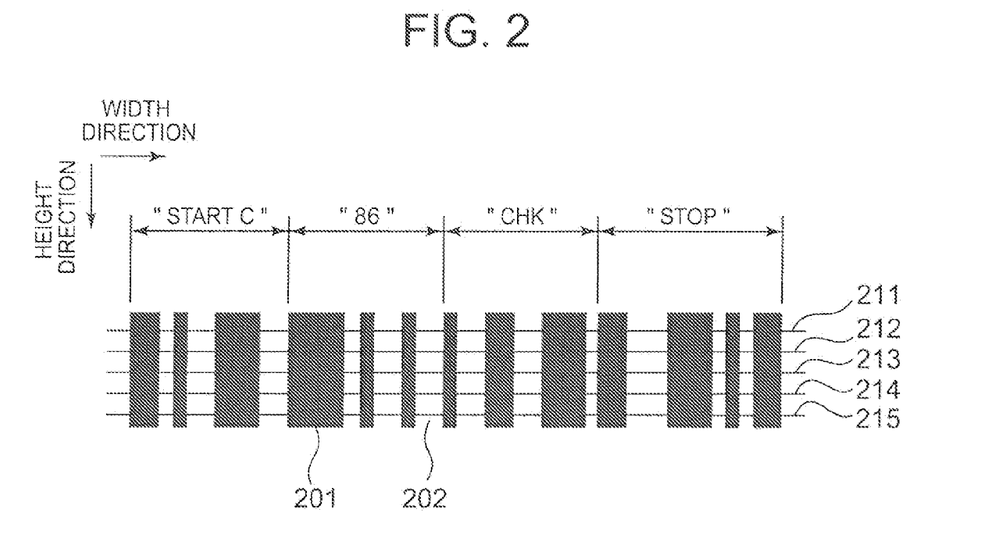
FIG. 2 is a conceptual diagram that explains a process of setting a plurality of scanning lines on a barcode according to the embodiment.

Structures of Barcode and Barcode Reading Apparatus:

FIG. 1 is a conceptual diagram showing a structure of a barcode reading apparatus according to the embodiment. FIG. 2 is a conceptual diagram showing an example of a barcode that is a type of barcode called "CODE128".

Barcode:

At first, a barcode to be used in the present embodiment is explained with reference to FIG. 1 and FIG. 2. An element provided with a reference numeral 151 in FIG. 1 and FIG. 2 is a barcode; and namely, in the present embodiment, it is a barcode according to a barcode standard "CODE128" (hereinafter called a barcode 151). The barcode 151 is formed at a predetermined position on a surface of a recording medium 150 through printing, etc.

As shown in FIG. 2, the barcode 151 includes an arrangement of each bar 201 and each space 202 in their width direction as elements of the barcode for recording information in order to express character information of a numeric character, an alphabetical character, a symbol, and the like according to the information of each element in the width direction (for example, size of the element in the width direction, its arrangement, and the like), wherein the barcode 151 being a one-dimensional barcode. In other words, the one-dimensional barcode is provided with information in the width direction of a plurality of bars 201 and spaces 202 placed in series, but with no information in a height direction of the bars 201 and spaces 202.

As shown in FIG. 2, the barcode 151 includes a start mark (a start character), data (a data character "86" in this case), a check digit (a check character "CHK"), and a stop mark (a stop character). Each of them makes up a character that is a minimum information unit of the barcode. Concretely to describe, each of the start mark, the data, and the check digit is constructed as a character by alternate placement of 3 bars 201 and 3 spaces 202. In the meantime, the stop mark is constructed as one character by alternate placement of 4 bars 201 and 3 spaces 202.

Each width of a bar and a space (namely, each element) is an integer multiple of a unit width called "unit module" as a minimum unit. In the present embodiment, each width of a bar and a space in the barcode 151 is one of once, twice, three-times, and four-times as large as the unit width (namely, one of one-module width to four-module width). Then, an overall length of a character (a sum of all the bar widths and space widths of the character), which is a minimum information unit, is made up to be an integer multiple of the unit width (unit module).

Concretely to describe, an overall length of each of the start mark, the data character, and the check digit other than the stop mark (each including 3 bars and 3 spaces) is made up to be eleven-times as large as the unit width (unit module), (namely, the overall length is provided with 11 modules); meanwhile, an overall length of the stop mark (including 4 bars and 3 spaces) is made up to be thirteen-times as large as the fundamental width (unit module), (namely, the overall length is provided with 13 modules).

In the case of the barcode 151 (CODE128) shown in FIG. 2, the data character ("86") has only one character (one information unit) in order for simplifying the explanation. In fact, an area where a data character is saved as an information datum of the barcode 151 has a variable length, and a plurality of data characters can be saved behind the start mark.

Barcode Reading Apparatus:

Explained next is a barcode reading apparatus 100 that reads out the barcode 151.

As shown in FIG. 1, the barcode reading apparatus 100 according to the present embodiment includes a medium transfer mechanism 110, an image capture section 120 as a reading section, an image memory 130 as a memory unit, and a reading process section 140. The medium transfer mechanism 110 has a transfer path 111, and transfer guides 112 & 113. At the time when image data of the recording medium 150 is read out, the recording medium 150 is transferred by a transfer means, not shown, such as transfer rollers and the like in a transfer direction, which an arrow 114 indicates, at a predetermined speed. At the same time, the image capture section 120 reads out the barcode 151 formed on a surface of the recording medium 150.

The image capture section 120 is a reading section that optically reads out the surface of the recording medium 150 to create data of the barcode 151. Being fixed to the medium transfer mechanism 110, the image capture section 120 includes a line of photoelectric conversion elements 121 laid out in a direction perpendicular to the transfer direction that the arrow 114 indicates. The image capture section 120 receives reflected light from the surface of the recording medium 150, and converts the reflected light into analog electrical signals. Furthermore, the image capture section 120 converts values of the analog electrical signals (values indicting brightness) into image data of digital multi-valued information. For example, in the case where the analog electrical signals are converted into image data of 8-bit digital multi-valued information, the brightness values indicated by the analog electrical signals are converted into 256-step digital brightness values (namely, brightness values expressed with integers within a range from 0 to 255). While the recording medium 150 being transferred at a certain constant speed, the photoelectric conversion elements repeat such operations at a constant frequency, such that image data of digital multi-valued information (hereinafter, called "multi-valued image data") including pixel data of 2-D arrangement can be obtained. The multi-valued image data includes multi-valued image data of the barcode 151. Incidentally, for example, a 1-D contact image sensor and the like can be adopted as the image capture section 120.

The image memory 130 is a memory unit for temporarily saving the multi-valued image data including the barcode 151. In the present embodiment, image data is regarded as a matrix having a finite number of pixels, and the multi-valued image data created by the image capture section 120 is saved with respect to a datum of each pixel. Incidentally, any device can be adopted as the image memory 130; for example, a Random Access Memory (RAM), a Synchronous Dynamic Random Access Memory (SDRAM), a Double-Data-Rate Synchronous Dynamic Random Access Memory (DDR-SDRAM), a Rambus Dynamic Random Access Memory (RDRAM), and the like, as long as it is able to save image data.

The reading process section 140 has functions for calculating information in a width direction of the elements, such as an arrangement of the plurality of elements constituting the barcode 151 of multi-valued image data, and a width dimension of each element, as well as for decoding the calculated information to character information of a numeric character, an alphabetical character, a symbol, and the like, according to the information in the width direction of the elements. The reading process section 140 includes a locating section 141, a scanning line setup section 142, a decoding section 143, and a judgment section 144.

The locating section 141 identifies the multi-valued image data of the barcode 151 in the multi-valued image data, which the image memory 130 has, in order to locate an area where the barcode 151 is indicated.

The scanning line setup section 142 sets a plurality of scanning lines for the area where the barcode 151 is indicated. FIG. 2 conceptually shows the scanning lines. For the barcode 151 shown in FIG. 2, five scanning lines 211 to 215 are placed at almost regular intervals along a height direction of the bars 201 and spaces 202. Though there is no specific restriction on the number of scanning lines and their intervals, preferably the scanning lines should be placed evenly all over the entire area of the barcode 151.

By using multi-valued image data, which corresponds to an area where the scanning lines 211 to 215 are placed, among the multi-valued image data that the image memory 130 stores, the decoding section 143 calculates element data and an arrangement of the element data as the information in the width direction of the elements. Subsequently, the decoding section 143 decodes data of the barcode 151 by using the element data and the arrangement of the element data. Then, the decoding section 143 outputs a decoded result corresponding to a scanning line that the judgment section 144 selects, as an eventual decoded result.

The element data herein means values to be calculated according to width dimensions of the elements among the information in the width direction of the elements. Sometimes the element data is indicated with a width value of each of the bars and spaces, or other times indicated with an "edge-to-corresponding-edge distance" that represents a sum of width values of a bar and its adjacent space. In the present embodiment, the barcode 151 is in compliance with CODE128, and then an "edge-to-corresponding-edge distance" is used as element data.

In the present embodiment, the decoding section 143 includes an element width calculating section 143a, a normalized-value calculating section 143b, and a character decoding section 143c.

The element width calculating section 143a calculates the element data, as described above, with the number of pixels. Concretely to describe, the multi-valued image data corresponding to a position, where one of the scanning lines 211 to 215 is placed, is measured so as to obtain the number of pixels for each element width. Then, the number of pixels of the element data is calculated according to the number of pixels obtained through the measurement. Furthermore, the number of pixels for a total length of one character is calculated.

The normalized-value calculating section 143b calculates element data normalized with respect to a unit module. Incidentally, "normalisation" in the present embodiment means a conversion process of the number of pixels for a width of each bar and each space, a length of each element datum, as well as a total length of one character into an integer ratio (unit module).

The character decoding section 143c includes a decoding reference table (not shown) for a conversion of the information in the width direction of the elements into character information. Subsequently, the character decoding section 143c obtains an arrangement of the element data, based on the element data normalized by the normalized-value calculating section 143b; and decodes the arrangement of the element data to a corresponding character by reference to the decoding reference table. Incidentally, an eventual output datum of a decoding operation result by the character decoding section 143c is output as a decoded result for a scanning line selected by a scanning line selecting section 144c of the judgment section 144, to be described later.

The judgment section 144 calculates reading reliability according to the multi-valued image data corresponding to each of the scanning lines 211 to 215, and selects a scanning line that shows a highest reliability among the calculated reading reliability values. In the present embodiment, the judgment section 144 includes a reading reliability calculation section 144a, a reading reliability judgment section 144b, and a scanning line selecting section 144c.

The reading reliability calculation section 144a calculates reading reliability of each of the scanning lines 211 to 215 set by the scanning line setup section 142. The reading reliability may be calculated either with respect to all the characters included in a barcode, or in relation to only one data character as well.

In the present embodiment, the reading reliability is calculated as a "marginal difference". The "marginal difference" herein means a reading error allowable for a normalized element datum to become a true value; and it is an index representing a degree of proof against barcode decoding error occurrence (a level of unlikeliness of error occurrence).

The reading reliability judgment section 144b makes a judgment on a highest reliability among the reading reliability values that the reading reliability calculation section 144a calculates for each of the scanning lines 211 to 215.

The scanning line selecting section 144c makes a selection of a scanning line corresponding to the reading reliability on which the reading reliability judgment section 144b makes a judgment; namely corresponding to the highest reliability value. Information of the selected scanning line is output to the character decoding section 143c of the decoding section 143.

Outline of Barcode Reading Process:

Explained next is operation of the barcode reading apparatus 100 structured as described above. At first, the medium transfer mechanism 110 starts transferring the recording medium 150, and meanwhile the image capture section 120 starts capturing an image of the recording medium 150. The image capture section 120 creates multi-valued image data (including 256-step digital brightness values) as described above to save the data into storage elements that constitute the image memory 130. Subsequently, the reading process section 140 decodes the barcode 151 by making use of the multi-valued image data saved in the image memory 130.

Next, a barcode reading process by the reading process section 140 is explained below with reference to FIG. 3, which is a flowchart for explaining an operation of the reading process section 140.

The reading process section 140 reads out the multi-valued image data from the image memory 130, and start the process. The multi-valued image data is input into the locating section 141.

Based on the multi-valued image data, the locating section 141 detects a position of an area where the barcode 151 is indicated (Step S301). A publicly-known technique can be used for detecting the position of the barcode 151. For example, the barcode position can be detected through calculating a vertical projection and a horizontal projection. More concretely, for example, a method described in Japanese Unexamined Patent Application Publication No. 2009-266190 may be adopted. As shown in FIG. 1 and FIG. 2, the locating section 141 creates location information on a left end limit position, a right end limit position, an upper end limit position, and a lower end limit position of the barcode 151 individually.

Next, the scanning line setup section 142 sets up scanning lines for the barcode 151 (Step S302). As described above, preferably five scanning lines 211 to 215 are placed evenly over the barcode 151 (Refer to FIG. 2).

Then, using arrays of pixels at positions of the scanning lines 211 to 215 among the multi-valued image data, the decoding section 143 decodes the barcode 151 with respect to each of the scanning lines (Step S303). The decoding operation is described later.

Subsequently, using a calculation result of the decoding section 143, the judgment section 144 carries out a judgment operation on the scanning lines (Step S304). Since the five scanning lines 211 to 215 are placed over one and the same barcode 151 in the present embodiment, decoded results on the scanning lines 211 to 215 are all the same each other as far as there exists no reading error. However, for example, sometimes these decoded results on the scanning lines 211 to 215 may not become equal to each other because of a reading error caused due to contamination, indefinite printing, etc., on the barcode 151. Furthermore, there is also a chance that reliability on the decoded results is low even though the decoded results are the same each other. When the reliability is low, sometimes it is useful to notify an application, which receives the decoded results, of a degree of the reliability. Therefore, in the present embodiment, reading reliability on each of the scanning lines 211 to 215 is calculated. Then, a judgment is made by using the calculation results, about the reliability of the decoded results on the scanning lines 211 to 215 in order to eventually adopt a decoded result on a scanning line having a highest reliability.

Figure 4:
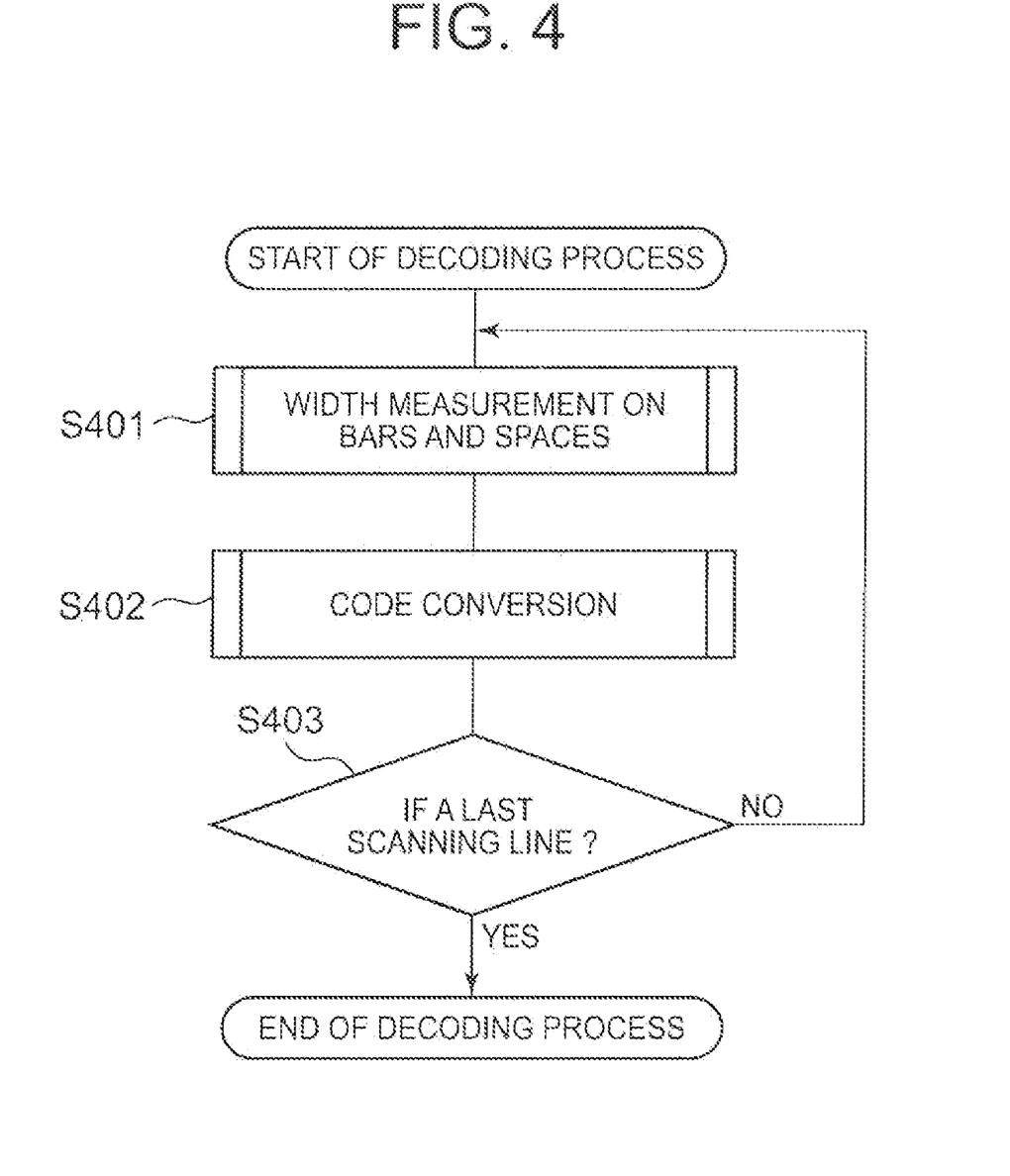
FIG. 4 is a schematic flowchart that explains operations by a decoding section according to the embodiment.

Decoding Process:

FIG. 4 is a flowchart that explains an example of concrete operations in a decoding process at Step S303 by the decoding section 143.

In the decoding section 143, the element width calculating section 143a measures (by counting the number of pixels) a width of each of elements (each of the bars 201 and spaces 202) as the number of pixels with respect to each scanning line, wherein the elements constituting the barcode 151; and calculates the number of pixels of element data and the number of pixels of an entire length of one character according to the number of pixels obtained through the measurement (Step S401).

Concretely to describe, the element width calculating section 143a reads out a digital brightness value of each pixel, with respect to a line of pixels corresponding to a first scanning line 211 shown in FIG. 2, namely an array of pixels in series placed along the scanning line 211. Then, according to brightness values of these pixels, edges (a start point and an end point) of each of the bars 201 and spaces 202 are measured, and a width dimension of each of the bars 201 and spaces 202 is measured (by counting the number of pixels).

Next, according to the width of bars and of spaces (width dimensions of elements) obtained in such a way, element data and their array (hereinafter, called "array of element data") are obtained, and a decoding operation (namely, code conversion) for the barcode 151 is carried out (Step S402). In the present embodiment, an element datum is an "edge-to-corresponding-edge distance" indicating a sum of width dimensions of a bar and a space that are placed side by side. Therefore, with respect to 3 bars (or 4 bars) and 3 spaces for constituting one character, 4 edge-to-corresponding-edge distances are obtained so as to calculate an array of element data. Then, a code word is obtained through normalization of the element data for a decoding process, namely code conversion. Details of the code conversion are described later.

Then, the decoding section 143 checks (Step S403), whether or not the procedures of Step S401 and Step S402 have been carried out for all the scanning lines 211 to 215, which were set up at Step S302. At the present stage, since the procedures have been carried out only for the scanning line 211, the decoding section 143 carries out the procedures of Step S401 and Step S402 for the remaining scanning lines 212 to 215. If it is judged that the procedures of Step S401 and Step S402 have been carried out for the scanning line 215, the decoding section 143 finishes the process of Step S303 (Refer to FIG. 3), and operation progresses to scanning line selection of Step S304.

Next, the measurement of element width (S401) and the decoding operation, namely code conversion (S402), are explained below in detail.

Method of Measurement of Element Width: S401

Figure 5:
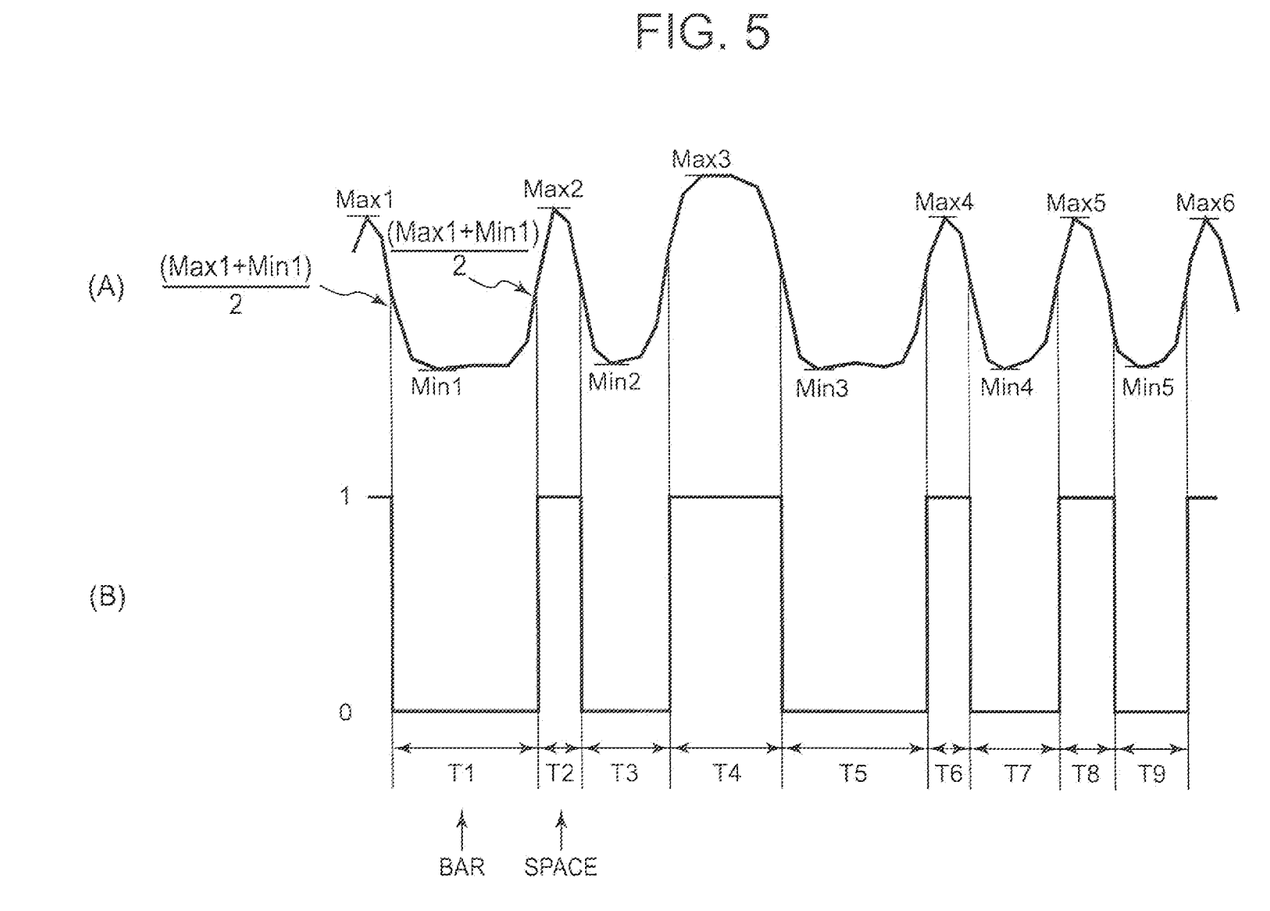
FIGS. 5A and 5B are conceptual waveform charts that explain operations by the decoding section according to the embodiment.

At first, explained with reference to FIG. 5 is a method in the present embodiment for determining edges of a barcode element and measuring a width of the element. FIG. 5A is a conceptual drawing that shows an example of a waveform of digital brightness in relation to the present embodiment; and in the meantime, FIG. 5B is a block-shaped waveform that shows an element array of the barcode obtained from the waveform of digital brightness shown in FIG. 5A.

Concretely to describe, brightness values of a line of pixels corresponding to a scanning line as an analysis object are measured at first to obtain the waveform of digital brightness shown in FIG. 5A. In the drawing showing the waveform, a horizontal axis and a vertical axis represent a location (a distance from a start point of the barcode 151) and a digital brightness value (a value within a range from 0 to 255) of a pixel at a location of measurement, respectively. Being in black, bars 201 are low in their reflection ratio so as to have small digital brightness values, and by contrast, spaces 202 being in white are high in their reflection ratio so as to have large digital brightness values. Therefore, in the brightness waveform shown in FIG. 5A, locations corresponding to the bars 201 have local minimum values Min1, Min2, and so forth; and in the meantime, locations corresponding to the spaces 202 have local maximum values Max1, Max2, and so forth.

As an array of pixels to be used for the measurement, one and only line of pixels corresponding to a scanning line (the scanning line 211 in the present case) may be used. Alternately, multiple lines of pixels adjacent to the objective scanning line may also be used instead. When such multiple lines of pixels are used, the vertical axis may represent an average value, a sum, and the like of digital brightness values of multiple pixels at the objective location. In the method for measuring an edge, a digital brightness value of each pixel is used in the present embodiment, as described above. Alternatively for example, adopted may be a method in which a waveform of scanning reflection ratio is used. Such a waveform of scanning reflection ratio is obtained by plotting reflection ratios of the bars 201 and spaces 202 of the barcode 151 along their width direction, and it is defined for example in JIS X0520 and so forth.

Next, in the present embodiment, the block-shaped waveform shown in FIG. 5B is obtained by using a local threshold method, in which a threshold is defined at a midpoint between positions of a local minimum value and a local maximum value, namely it is judged that a position of the midpoint has an edge between a bar 201 and a space 202. In FIG. 5B, a horizontal axis represents a location in the barcode in the same way as it does in FIG. 5A, and meanwhile a vertical axis shows a distinction between a bar 201 and a space 202 in such a way that intervals with vertical axis values of "0" and "1" correspond to a bar 201 and a space 202, respectively.

Alternatively for example, used instead of the local threshold method may be a fixed threshold method, in which an average of digital brightness values of all pixels corresponding to a scanning line is calculated so as to define a threshold at a position with the average in the vertical axis, namely it is judged that the position has an edge between a bar 201 and a space 202.

Then, each element width is measured in such a way that, while presuming intervals T1, T3, and so forth with a vertical axis value of "0" in FIG. 5B to be those of the bars 201 and other intervals T2, T4, and so forth with a vertical axis value of "1" in FIG. 5B to be those of the spaces 202, the number of pixels (in the horizontal axis direction) for each element width is counted.

Code Conversion: S402

Figure 6:
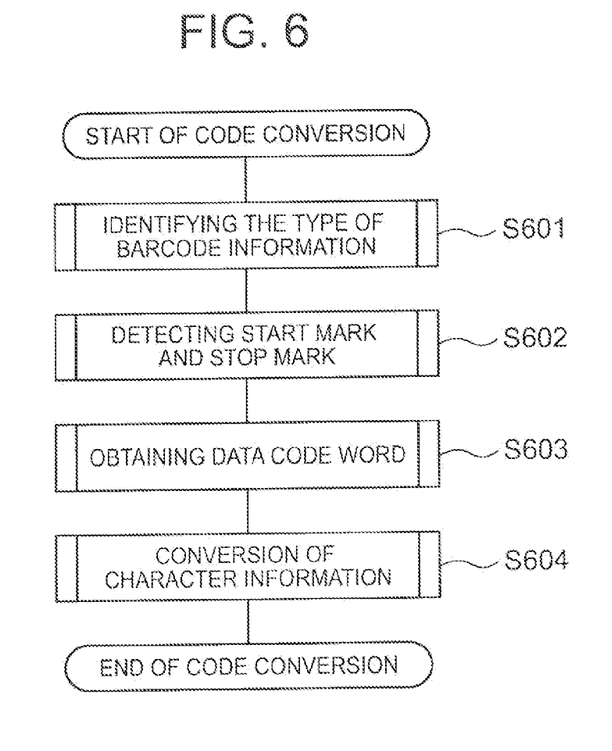
FIG. 6 is a schematic flowchart that explains operations by the decoding section according to the embodiment.

FIG. 6 is a flowchart for explaining an example of concrete procedures of code conversion (decoding operation) at Step S402 described above.

For the code conversion, the barcode 151 is recognized at first in order to identify the type of barcode standard (Step S601). Depending on its type of barcode standard, the barcode 151 has different widths and different arrangement of the bars and spaces constituting a start part of a start mark and an end part of a stop mark. For example, in the case of the barcode standard CODE128 for the present embodiment, a width ratio of a bar, a space, and a bar is 2:1:1 at a beginning part of a start mark; and in the meantime, a width ratio of a bar, a space, and a bar is 1:1:2 at an end part of a stop mark. Therefore, analyzing the widths and arrangement of the bars and spaces at the start part and end part makes it possible to identify the type of barcode 151. Since the present embodiment is based on the barcode standard CODE128, a detailed explanation on a method for identifying a type of barcode according to any other barcode standard is just omitted.

Detection of Start Mark and Stop Mark

Then, in the case where the type of barcode standard is identified as the standard CODE128, the start mark and stop mark are detected (Step S602).

The barcode 151 saves a data character having its variable length between the start mark and the stop mark. For this reason, at first the barcode reading apparatus 100 according to the present embodiment detects the start mark and stop mark so as to determine a data recording direction in the barcode 151, a start point of the data character, and an end point of a check digit; and recognizes the barcode to be based on the standard CODE128. Especially, in the detection of the start mark, it is identified which code the character set complies with among Code-A, Code-B, and Code-C in the standard CODE128.

Concretely to describe, in the detection of the start mark, width data of 3 bars and 3 spaces constituting the start mark (at the very beginning of the barcode) is obtained as the number of pixels (measurement values) in image data of digital multi-valued information, namely as a result of the element width measurement (Step S401) described above in order to calculate the measurement values of element data. In the present embodiment, an "edge-to-corresponding-edge distance" is obtained as an element datum. On the other hand, the unit module, being a fundamental unit width for an element, is used as a scale in the barcode standard; and the measured number of pixels (measurement values) in the element data includes a measurement error. Then, using the measurement values based on the number of pixels, the decoding section 143 obtains the element data, normalized according to the unit module, and their array (array of element data). Hereinafter, the normalized array of element data is called a "code word".

From the decoding reference table, the decoding section 143 retrieves character information that complies with a code word representing a start mark, and outputs the character information, and then operation progresses to detection of a stop mark. At the time, if no corresponding code word exists in the decoding reference table, information is output to notify that an error has happened in the decoding operation.

A stop mark is constructed as one character by alternate placement of 4 bars 201 and 3 spaces 202. In the same way as it does for the start mark, the decoding section 143 obtains a code word representing a stop mark, and retrieves character information that complies with the code word, from the decoding reference table; and outputs the character information. Then, operation progresses to an analyzing process for obtaining a code word for a data character (S603). At the time, if no corresponding code word exists in the decoding reference table, information is output to notify that an error has happened in the decoding operation.

Analysis on Data Character:

Explained next is a process for obtaining a "data code word" through normalizing an array of element data of a data character with the unit module (Step S603: Obtaining data code word). On this occasion, the "data code word" is a series of numerals that represents character information, and the series of numerals is obtained by normalizing an array of element data corresponding to a data character with the unit module. A data character representing a piece of character information is a series of 6 elements in total, including a 3 bars 201 and 3 spaces 202, in the same way as the start mark described above is; and it is composed of 11 modules (11 times as large as the unit width) in its full length. Incidentally, a data character, a data code word, and character information are in their one-on-one relationship, and the decoding reference table is a correspondence table showing relationships between data code words and character information.

Figure 7:
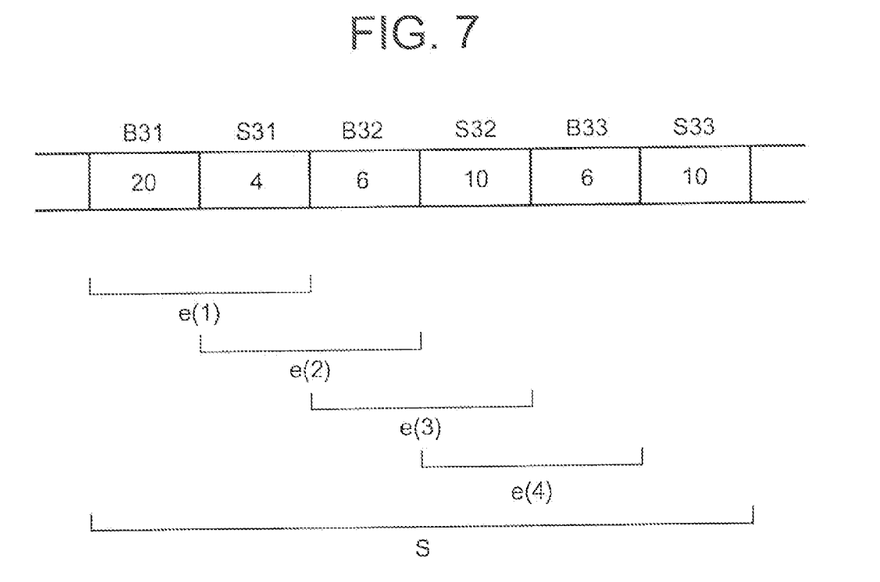
FIG. 7 is a conceptual drawing that explains a way for the decoding section according to the embodiment to obtain a data code word.

With reference to FIG. 7, the process for obtaining a "data code word" through normalizing an array of element data of a data character with the unit module (Step S603) is explained below in a concrete manner. FIG. 7 is a conceptual drawing for explanation on a way for obtaining a data code word.

In FIG. 7, a data character being an object for obtaining a code word is composed of 6 elements in total including 3 bars B31, B32, and B33 and 3 spaces S31, S32, and S33. Based on the data character, the decoding section 143 calculates 4 "edge-to-corresponding-edge distances", namely e(1), e(2), e(3), and e(4) expressed with the number of pixels, as element data. As described above, an "edge-to-corresponding-edge distance" represents a sum of width dimensions of a bar and a space that are placed side by side, namely a distance from a front edge of a bar (or, a space) to a tail edge of a space placed next to the bar. Therefore, an "edge-to-corresponding-edge distance" is a value as a result of adding width measurement values of two elements; namely each of the bars B31, B32, and B33 and its neighboring one of the spaces S31, S32, and S33. Thus, a use of the "edge-to-corresponding-edge distance" makes it possible to unlikely have an unfavorable effect such as a print error, etc., on the bar code 151.

Starting from a top of the elements, a measurement value in the number of pixels for a width (namely, a width measurement value) of the bar B31 is "20 pixels"; a width measurement value of the space S31 is "4 pixels"; a width measurement value of the bar B32 is "6 pixels"; a width measurement value of the space S32 is "10 pixels"; a width measurement value of the bar B33 is "6 pixels"; a width measurement value of the space S33 is "10 pixels". Meanwhile, as described above, a data character (one character) of the barcode 151 according to the standard CODE128 in the present embodiment is specified to have 11 modules in its full length (a total sum of the 3 bars B31, B32, and B33 and the 3 spaces S31, S32, and S33). Therefore, the number of pixels for a unit width (a unit module) is calculated as described below.

Where a measurement value on a total length of the data character being "S", the number of unit modules (standard value) in the total length of the data character being "m", and the number of pixels in a unit module (unit width) being "w"; "S" is a sum of width measurement values of the 3 bars and 3 spaces, and therefore the following expressions are applied:

$S=20+4+6+10+6+10=56$ (i.e., 56 pixels)

$m=11$ modules $w=S/m=56/11$

On the other hand, where measurement values of the element data being expressed as "e(i)" (wherein "i"=1, 2, 3, & 4); e(1) is a sum of the width values of the bar B31 and its adjacent space S31, e(2) is a sum of the width values of the space S31 and its adjacent bar B32, e(3) is a sum of the width values of the bar B32 and its adjacent space S32, and e(4) is a sum of the width values of the space S32 and its adjacent bar B33, and therefore the following calculations are applied:

$e(1)=20+4=24$ $e(2)=4+6=10$ $e(3)=6+10=16$ $e(4)=10+6=16$

Next, the decoding section 143 multiplies a measurement value of a "edge-to-corresponding-edge distance", namely e(i), as an element datum by "m/S" in order to obtain a calculation value "t(i)" of unit modules of the element datum before normalization, as described below:

$t(i)=e(i)/w=e(i)\times(m/S)$

Concretely, the calculation values are obtained in the case of FIG. 7 as described below:

$t(1)=e(1)/w=24\times(11/56)=4.714$ $t(2)=e(2)/w=10\times(11/56)=1.964$ $t(3)=e(3)/w=16\times(11/56)=3.143$ $t(4)=e(4)/w=16\times(11/56)=3.143$ Then, "t(i)" is normalized. Namely, each value of "t(i)" is round off to unit. In the present embodiment, the round-off operation is executed by adding 0.5 to "t(i)" at first and discarding numbers after the decimal point. That is to say; element data after normalization "E(i)" is calculated as described below:

$$E(i) = \text{INT}(t(i) + 0.5) \quad \text{Expression (3)}$$
$$= \text{INT}(e(i) \times (m/S) + 0.5)$$
wherein $i = 1, 2, 3, \& 4$ (Incidentally, "INT(x)" is a function for returning a maximum integer that is not greater than the parameter "x")
Therefore;

$E(1)=\text{INT}(24\times(11/56)+0.5)=5$ $E(2)=\text{INT}(10\times(11/56)+0.5)=2$ $E(3)=\text{INT}(16\times(11/56)+0.5)=3$ $E(4)=\text{INT}(16\times(11/56)+0.5)=3$ As a result, obtained is a data code word [5 2 3 3] corresponding to an array of element data [E(1), E(2), E(3), & E(4)] that has been normalized.

The normalization of element data is carried out in this way, namely; through dividing the number of pixels for the total length of one character obtained from the element width calculating section 143a (the number of pixels: "S") by the number of modules corresponding to the total length of one character (the number of modules: "m") in order to calculate the number of pixels per a unit module included in the barcode 151 (unit width value); dividing the number of pixels for the width of each element (each bar and each space) by the unit width value to convert the width data into the number of unit modules for calculating the number of modules for the element data and the total length of one character; and making an adjustment on a reading (measurement) error for the purpose of conversion so as to define each element width being once, twice, three-times, or four-time as wide as the unit width; and then the code word is eventually obtained.

Incidentally, according to the barcode pattern standard CODE128, the width of each bar and each space is once, twice, three-times, or four-time as wide as the unit width; and in the meantime, there is no chance of both of a bar and a space placed side by side having a four-time wide width at the same time. Therefore, E(i), namely being the number of modules in each normalized element datum (edge-to-corresponding-edge distance), is an integer within a range from 2 to 7.

After obtaining the code word in the way as described above, the decoding section 143 retrieves a value of the character corresponding the code word from a decoding reference table (not shown) so as to convert the code word into a character for decoding data (Step S604). The decoding reference table is created according to, for example, a rule of the standard CODE128, such as JIS X0504 and the like.

In an example shown in FIG. 7, since a data code word is [5 2 3 3] according to the array of normalized element data "E(i)", a value of the character "86" is retrieved from the decoding reference table.

Though the data includes only 1 character "86" in the present embodiment, an area for saving data in the barcode 151 has a variable length, and therefore sometimes a plurality of characters are saved. In such a case, the operation for retrieving a data code word is repeated for all the data characters saved in the barcode 151.

The operation of decoding data for retrieving a value of a character is carried out for all the data characters obtained in Step S603 described above.

Subsequently, an operation of error correction on the result of data decoding operation is carried out by making use of an error correction code included in the barcode 151. A method of error correction can be applied as stipulated in the standard CODE128, and therefore an explanation on the method is omitted on this occasion. Thus, the data decoding operation of Step S604 described above comes to an end.

After the procedures described above, the decoding operation of Step S402 (Refer to FIG. 4) comes to an end.

Judgment on Reading Reliability:

As described above, in the present embodiment, reading reliability on each of the scanning lines 211 to 215 is calculated so as to make a judgment on the reliability of the decoded results on the scanning lines 211 to 215 by using the calculation results. The reading reliability is calculated by making use of a marginal difference at the time of reading the barcode. Explained below is a method for calculating the reading reliability.

As described above, the "marginal difference" herein means a width (range) of a reading error allowable for a normalized element datum to become a true value; and it is an index representing a degree of proof against barcode decoding error occurrence (a level of unlikeliness of error occurrence). Concretely to describe, if there exists a large gap between an element datum value according to an actual measurement (an actual measurement value calculated by using the multi-valued image data of the barcode 151 saved in the image memory 130) and a limit value indicating a range for a measurement value for obtaining a true normalized value, an allowable reading error is large. By contrast, if there exists only a small gap, an allowable reading error is small. Thus, the "marginal difference; is defined as described below.

At first in the process of decoding the barcode 151 in order to obtain the element data E(i) at the time of getting a data code word, with respect to the actual measurement value "e(i)" of the "edge-to-corresponding-edge distance" obtained by counting the number of pixels, the calculated value "t(i)" as a result of conversion by using the unit module is rounded off for normalization, as Expression (3) shows. Therefore, a possible range for the value "t(i)" is expressed as; $E(i)-0.5 \leq t(i) < E(i)+0.5$. In other words, a lower limit of the value "t(i)" that results in the normalized value "E(i)" is "E(i)−0.5", and on the other hand, its higher limit is a value that is smaller than "E(i)+0.5".

Where the lower and higher limit values are "E(i)−0.5" and "E(i)+0.5", respectively, the calculated value "t(i)" corresponds to a value of an element datum according to an actual measurement. Then, either a gap between the "t(i)" and the lower limit value or a gap between the "t(i)" and the higher limit value, whichever is smaller, is defined as the "marginal difference" of the "t(i)". In other words, either an absolute value of a difference between the "t(i)" and (E(i)−0.5) or an absolute value of a difference between the "t(i)" and (E(i)+0.5), whichever is smaller, can be calculated as the "marginal difference" of the "t(i)". Namely, if a reading error is within a range of gaps, centering around the "t(i)" and extending in both plus and minus directions with a distance of the smaller "marginal difference", the "E(i)" can be a normalized values without any error for sure.

For example, when a normalized value "E(i)" for an edge-to-corresponding-edge distance "e(i)" is 4 as an element datum, the limit values are 3.5 and 4.5. Therefore, if the calculated value "t(i)" as a result of an actual measurement is 4 for example, the "marginal difference" is 0.5. If the calculated value "t(i)" is 3.6 or 4.4, the "marginal difference" is 0.1. The smaller the "marginal difference" is, the limit values come closer and the more likely a reading error happens. Therefore, in such a case, the reliability on the value "E(i)" as a result of a normalization calculation is low.

For the barcode 151, 4 element data E(i)s are used for one data code word, as described above. In the present embodiment, a "marginal difference" is calculated for each of the 4 element data E(i)s, and a "marginal difference" for the data code word is defined with a smallest one among the four "marginal difference" values. Furthermore, reliability for a scanning line is defined with a smallest one among "marginal difference" values for a data code word corresponding to the scanning line. Namely, reading reliability for all the scanning lines 211 to 215 is defined with a minimum one among all the "marginal difference" values corresponding the scanning lines. Accordingly, the minimum "marginal difference" represents a best reading reliability.

In a working example shown in FIG. 7, for the E(1)=5 (a calculated value within its allowable range is 4.5 or larger, but smaller than 5.5), the calculated value t(1)=24×(11/56)= 4.7 . . . , and therefore the "marginal difference" in this case is a difference between the calculated value t(1) and 4.5, namely about 0.2. For the E(2)=2 (a calculated value within its allowable range is 1.5 or larger, but smaller than 2.5 in the same manner), the calculated value t(2)=10×(11/56)=1.9 . . . , and therefore the "marginal difference" in this case is a difference between the calculated value t(2) and 1.5, namely about 0.4. Furthermore, for the E(3)=3 (a calculated value within its allowable range is 2.5 or larger, but smaller than 3.5 in the same manner), the calculated value t(3)=16×(11/56)= 3.1 . . . , and therefore the "marginal difference" in this case is a difference between the calculated value t(3) and 3.5, namely about 0.4. For the E(4), the same result as for the E(3) is given. Accordingly, a "marginal difference" for the normalized array of element data (i.e., the data code word [5 2 3 3]) is given with the "marginal difference" for the E(1), namely about 0.2.

After calculating the reading reliability for all the scanning lines 211 to 215, the scanning line selecting section 144c selects a scanning line having the best reading reliability. Then, the judgment section 144 outputs a decoded result for the selected scanning line (Refer to Step S303 shown in FIG. 3) as a decoded result for the barcode 151.

The judgment section 144 may also output reading reliability for the decoded result in addition, as a datum for indicating reliability of the decoded result. Alternatively, such reading reliability may be output as reference information notifying that the reading reliability on the decoded result is insufficient when the reading reliability is lower (worse) than a prescribed value.

Advantageous Effect of the Embodiment

According to the present embodiment as described above; a plurality of scanning lines are set on a barcode; reading reliability for indicating how unlikely an error on decoding a barcode happens is calculated with respect to barcode data according to each scanning line; and therefore reading reliability for each scanning line can be evaluated by making use of the reading reliability calculated. Then, based on the evaluation of the reading reliability for each scanning line, the decoded result corresponding to the scanning line having the best reading reliability is adopted as the decoded result for the barcode, and therefore the reliability for the decoded result on the barcode can be improved.

Specifically, the reading reliability calculation section calculates reading reliability for each scanning line, the reading reliability judgment section makes a judgment on a best reading reliability among the above calculation results, and furthermore the scanning line selecting section selects a scanning line corresponding to the above judgment result. Therefore, obtained can be the scanning line having the best reliability and also its evaluation level of reliability.

Moreover, for evaluating the reading reliability, used is a "marginal difference" calculated for each element datum included in a barcode, and therefore the reliability can be evaluated through a simple calculation process.

Furthermore, according to the present embodiment, the reading reliability is calculated by using a measurement value and a normalized value with respect to each element datum (i.e., an "edge-to-corresponding-edge distance"), and therefore the reliability can be evaluated through a simple calculation process.

Moreover, according to the present embodiment, the "marginal difference" can be calculated by using an interim result in course of calculation of normalizing each element datum (i.e., an "edge-to-corresponding-edge distance"), and therefore the calculation process can be simplified from this viewpoint as well.

Furthermore, according to the present embodiment, an "edge-to-corresponding-edge distance", is used as an element datum, and therefore the barcode reading operation is unlikely to have an unfavorable effect such as a print error, etc., on the bar code 151 so that the reliability for a decoded result on the barcode can be furthermore improved.

Other Embodiments

Figure 3:
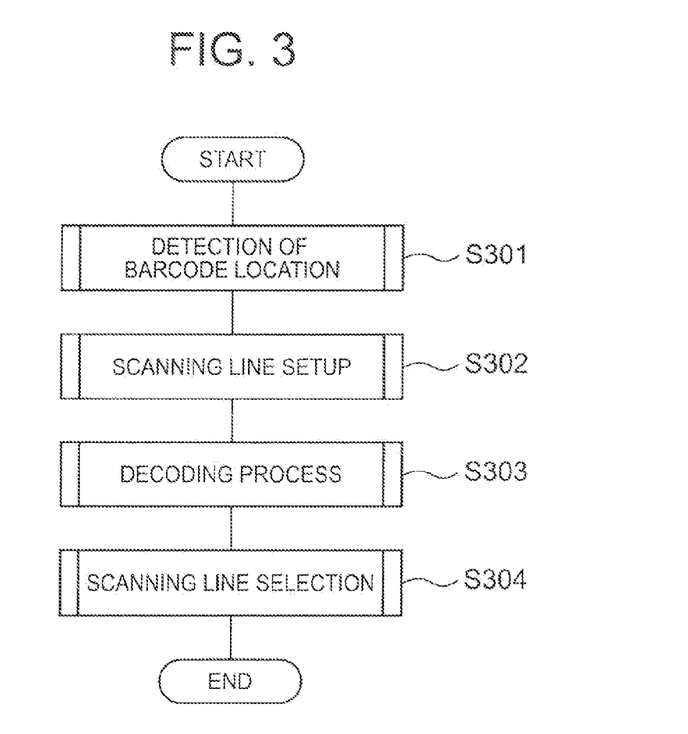
FIG. 3 is a schematic flowchart that explains operations by a reading process section according to the embodiment.

In the present embodiment, after decoding operations for all the scanning lines 211 to 215 finishes, the reading reliability is calculated with respect to these scanning lines 211 to 215 (Refer to Steps S303 and S304 in FIG. 3). Alternatively, these operations may be carried out in such a way that a decoding operation and a reading reliability calculation are successively executed for the first scanning line 211 at first, then the same operations are executed next for the second scanning line 212, and so forth in due order.

There exists only one data character in the case of the present embodiment. If a barcode includes a plurality of data characters, calculated may be measurement values and normalized values with respect to all the data characters on a scanning line in order to calculate marginal differences and define a marginal difference for the data code word with a smallest one of those marginal differences. Furthermore, reading reliability of a scanning line may be defined with a smallest one of marginal differences for the data code word corresponding to the scanning line.

Though an "edge-to-corresponding-edge distance" is used as an element datum in the present embodiment, an element datum is not limited to such an "edge-to-corresponding-edge distance". For example, a width of each bar and each space may be used as an element datum individually as it is.

In the present embodiment, an explanation is made for the example in which the present invention is applied to the barcode reading apparatus including a medium transfer mechanism and a 1-D image sensor. As other applications, the present invention can be applied to any one of a reading apparatus of a handy type having no medium transfer mechanism, a reading apparatus using an area sensor (Such as a 2-D CCD, a CMOS imager, and the like), and so forth.

Furthermore, a barcode part may be extracted by using a camera such as a CCD and the like that takes a picture of a barcode, while an image processing operation is executed on the video data, for detecting and decoding the barcode. Moreover, applied may be a laser scanning method in which a barcode is scanned with a laser beam and its reflected beam is detected by a 1-D optical sensor for obtaining a barcode character.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

100. Barcode reading apparatus
110. Medium transfer mechanism
111. Transfer path
112 & 113. Transfer guides
120. Image capture section
121. Line of photoelectric conversion elements
130. Image memory
140. Reading process section
141. Locating section
142. Scanning line setup section
143. Decoding section
143a. Element width calculating section
143b. Normalized-value calculating section
143c. Character decoding section
144. Judgment section
144a. Reading reliability calculation section
144b. Reading reliability judgment section
144c. Scanning line selecting section
150. Recording medium
151. Barcode
201. Bar
202. Space
211, 212, 213, 214, & 215. Scanning lines

What is claimed is:

1. A barcode reading apparatus comprising:
a reading section for creating data of a barcode by optically reading a surface of a medium;
an image memory for saving the data;
a scanning line setup section for setting a plurality of scanning lines for the data saved in the image memory;
a decoding section for decoding the barcode with respect to a part of the data corresponding to each of the scanning lines; and
a judgment section for calculating a reading reliability that represents a degree of proof against decoding error occurrence in decoding the barcode, by using the data corresponding to the scanning lines, and for selecting a scanning line having a best reliability by making use of the reading reliability;
wherein the judgment section comprises:
a reading reliability calculation section for calculating the reading reliability of each of the plurality of scanning lines set by the scanning line setup section;
a reading reliability judgment section for making a judgment on a best reliability value among the reading reliability values that the reading reliability calculation section calculates; and
a scanning line selecting section for making the selection of the scanning line having to the best reading reliability; and
wherein the reading reliability calculation section comprises:
a marginal difference calculation section for calculating a marginal difference that represents a degree of proof against reading error occurrence with respect to each element datum calculated according to element width values of the barcode, for each of the plurality of scanning lines; and
a reading reliability determination section for determination of the reading reliability of each of the scanning lines by selecting a smallest one among the marginal difference values corresponding to the scanning line.

2. The barcode reading apparatus according to claim 1;
wherein the decoding section comprises:
a means for extracting at least one character from the data corresponding to each of the scanning lines;
a means for calculating each measurement value "e(i)" for an element datum of the one character for each of the scanning lines, and calculating a total length measurement value "S" of the one character;
a means for calculating a ratio "m/S" between the number of unit modules "m" for the total length of the extracted one character and the total length measurement value "S", for each of the scanning lines;

a means for calculating "t(i)=e(i)×m/S" and rounding off the "t(i)" to unit so as to calculate a normalized value "E(i)" of each element datum; and a means for executing a character decoding operation according to the normalized value "E(i)" of the element data; and wherein the marginal difference calculation section comprises:

a means for calculating a marginal difference for the "t(i)" with, either an absolute value of a difference between the "t(i)" and a lower limit value, or an absolute value of a difference between the "t(i)" and a higher limit value, whichever is smaller, while the lower and higher limit values for the "t(i)" that enables obtaining the normalized value "E(i)" for the element datum are "E(i)−0.5" and "E(i)+0.5", respectively.

3. The barcode reading apparatus according to claim 1;
wherein the element datum is an "edge-to-corresponding-edge distance" in the barcode.

4. A barcode reading method comprising:

a first step of creating data of a barcode by optically reading a surface of a medium;

a second step of saving the data into an image memory;

a third step of setting a plurality of scanning lines for the data saved in the image memory;

a fourth step of decoding the barcode with respect to a part of the data corresponding to each of the scanning lines; and a fifth step of calculating reading reliability that represents a degree of proof against decoding error occurrence in decoding the barcode, by using the data corresponding to the scanning lines, for selecting a scanning line having a best reliability by making use of the reading reliability;

wherein the fifth step comprises:

a reading reliability calculation step for calculating the reading reliability of each of the plurality of scanning lines set in the third step:

a reading a judgment on a best reliability value among the reading reliability values calculated in the reading reliability calculation step; and a scanning line selecting step for making the selection of the scanning line having the best reading reliability; and wherein the reading reliability calculation step comprises:

a marginal difference calculation step for calculating a marginal difference that represents a degree of proof against reading error occurrence with respect to each element datum calculated according to element width values of the barcode, for each of the plurality of scanning lines; and a reading reliability determination step for determining the reading reliability of each of the scanning lines by selecting a smallest one among the marginal difference values corresponding to the scanning line.

5. The barcode reading method according to claim 4;
wherein the fourth step comprises:

a step of extracting at least one character from the data corresponding to each of the scanning lines;

a step of calculating each measurement value "e(i)" for a element datum of the one character for each of the scanning lines, and calculating a total length measurement value "S" of the one character;

a step of calculating a ratio "m/S" between the number of unit modules "m; for the total length of the extracted one character and the total length measurement value "S", for each of the scanning lines;

a step of calculating "t(i)=e(i)×m/S" and rounding off the "t(i)" to unit so as to calculate a normalized value "E(i)" of each element datum; and a step of executing a character decoding operation according to the normalized value "E(i)" of the element data; and wherein the marginal difference calculation step calculates;

a marginal difference for the "t(i)" with, either an absolute value of a difference between the "t(i)" and a lower limit value, or an absolute value of a difference between the "t(i)" and a higher limit value, whichever is smaller, while the lower and higher limit values for the "t(i)" that enables obtaining the normalized value "E(i)" for the element datum are "E(i)−0.5" and "E(i)+0.5", respectively.

6. The barcode reading method according to claim 4;
wherein the element datum is an "edge-to-corresponding-edge distance" in the barcode.

* * * * *